UNITED STATES PATENT OFFICE.

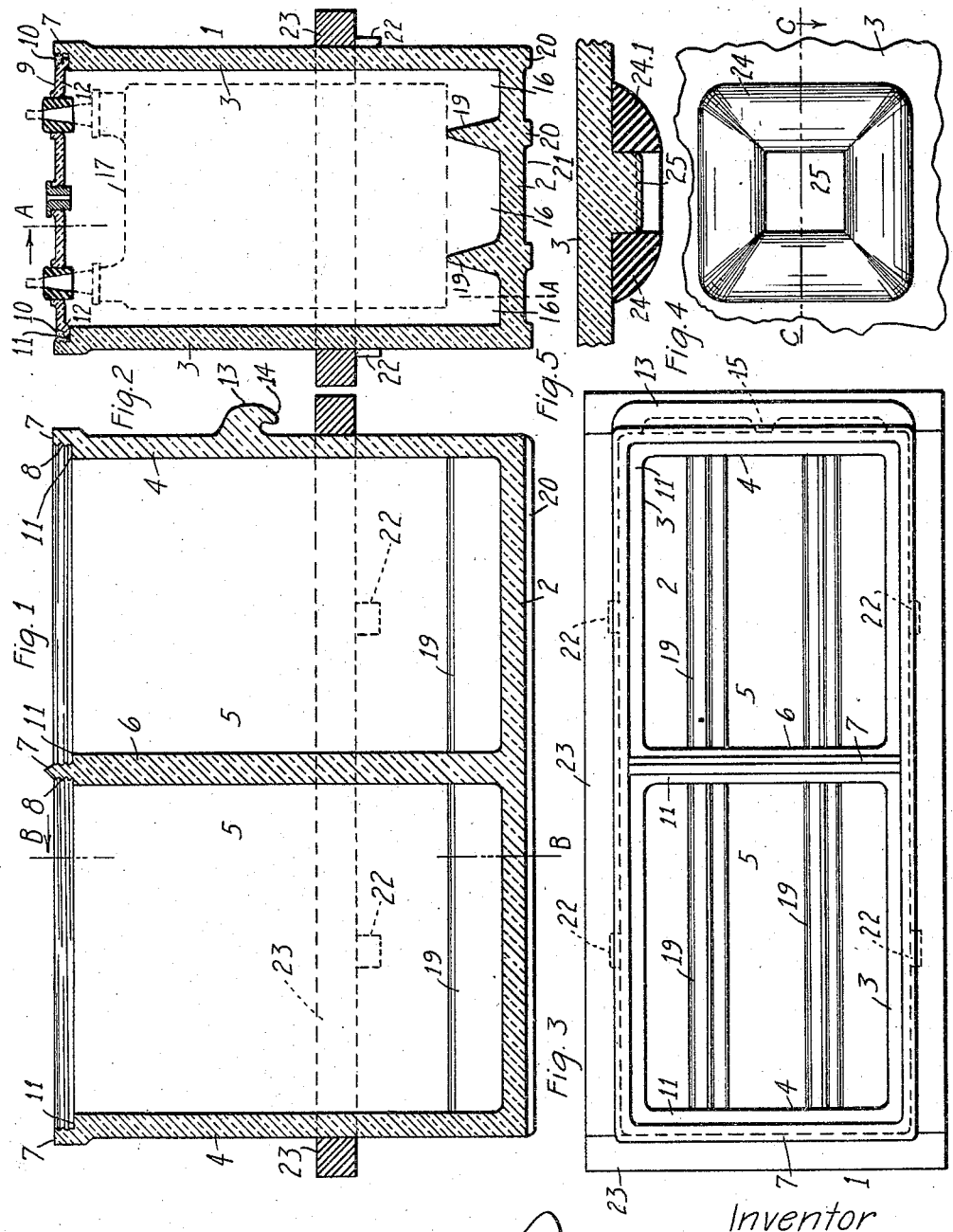

RUFUS N. CHAMBERLAIN, OF CHICAGO, ILLINOIS, ASSIGNOR TO GOULD STORAGE BATTERY COMPANY, A CORPORATION OF NEW YORK.

JAR FOR ELECTRIC BATTERIES.

1,183,951.      Specification of Letters Patent.      Patented May 23, 1916.

Application filed March 31, 1913. Serial No. 757,954.

*To all whom it may concern:*

Be it known that I, RUFUS N. CHAMBERLAIN, a citizen of the United States of America, and a resident of Chicago, county of Cook, and State of Illinois, have invented certain new and useful Improvements in Jars for Electric Batteries, of which the following is a specification.

The main objects of this invention are to provide an improved battery jar or tank especially adapted for railway service, which shall be inexpensive to manufacture, adapted for use in relatively large units, being chemically inert, impervious to acid, and free from deterioration by wear or disintegration, mechanically very rigid and strong, adapted to be readily rendered non-slopping and non-spilling, and constructed and arranged to readily provide for either deflecting or absorbing all ordinary mechanical shocks without injury to the jar; to provide an improved construction whereby an arrangement of buffers is assembled with each jar in such manner as to protect the same against injury in handling and in service, and thereby make practical in the manufacture of such jars the use of fragile materials such as glass, vitreous stoneware, or ceramic material, which though strong and impervious to acid are usually extremely brittle and liable to become easily broken; and to provide a construction which does not require the use of linings, insulation, metallic handles, and other fittings, and thereby greatly reduces the number of parts which require attention and repair or are subject to deterioration and replacement.

Certain specific constructions embodying this invention are illustrated in the accompanying drawings, in which:

Figure 1 is a vertical longitudinal section of a jar adapted for railway service, the section being taken along the line A—A of Fig. 2 and the cover being omitted. Fig. 2 is a vertical cross section of the jar along the line B—B of Fig. 1, the cover being shown in place and a preferred form of buffer being shown on the sides. Fig. 3 is a top plan of the jar with the cover removed. Fig. 4 is an enlarged front elevation showing a portion of the exterior face of a jar with a modified form of buffer and supporting lug therefor. Fig. 5 is a horizontal section of the same on the line C—C of Fig. 4.

In the construction shown in Figs. 1, 2, and 3, the battery jar 1 is composed of inexpensive but durable material of ceramic nature, as vitreous stoneware, porcelain, or the like, and comprises the bottom 2, sides 3, and ends 4. The jar may have a plurality of cell spaces 5. In the drawing two are shown, separated by a partition 6 formed integrally with the jar, the specific number of cell spaces per jar being determined in any particular case by operating convenience and the size of cell required.

The jar is formed with an open top, or more specifically each cell compartment is formed with an open top or rim 7 around the inner side of which, adjacent the edge, is provided one or more grooves 8 adapted to engage and interlock with suitable closing means, as a rigid cover member 9, in combination with a body of sealing material 10, as paraffin, wax, tar, pitch, asphalt, or the like. The interior of the rim 7 may be grooved by means of a "comb" having suitably formed teeth, said "comb" being drawn around the interior of the rim horizontally to form the grooves when the jar is being molded. At the lower edge of the grooved rim 7, and inwardly disposed with respect thereto is formed a horizontal perimetric ledge or seat 11 adapted to receive the rim 12 of the cover 9 thereon for support.

The cover 9 may be composed of any suitable material, as wood, metal, hard rubber, glass, or the like, and is formed to fit loosely within the jar rim 7 to provide space for the sealing compound to fill in and set between the grooves 8 and the rim of the cover. The interior portion of the cover adjacent to the rim 12 is preferably raised, so as to limit the flow of sealing material substantially to an effective zone at and adjacent to the jar and cover rims.

A grip or handle 13 is formed integrally on the exterior of the jar to facilitate lifting and carrying the same when empty, and also to facilitate withdrawing the jar or cell from its place in alinement with other jars, as on a shelf or in a battery tray or cabinet (not shown) where it may be installed for use, or for otherwise moving the jar about. This handle is preferably located at one end of the jar. Great strength and capacity are secured by forming the handle entirely across the end of the jar and by turning its outer margin 14 downwardly, and providing one or more vertical web portions 15 formed to bridge the space between the jar wall and the downwardly turned marginal portion for bracing and reinforcing the latter.

The bottom of the jar on the inside is ribbed to provide circulation spaces or passage ways 16 for the electrolyte, to insulate and support the battery plates 17 and to provide for the settling and collection of sediment beneath and away from the plates to prevent short-circuiting thereof. This ribbing also serves to reinforce and strengthen the jar. For this purpose a plurality of upstanding ribs 19 of like character, ordinarily two in number, are formed integrally on the bottom of the jar. These are parallel and are suitably spaced from each other and from the parallel walls to receive the plates transversely thereon. The ribs may be formed either transversely or longitudinally of the jar or cell space, depending on the size, number, and arrangement of plates to be provided for. The under side of the bottom is also ribbed to correspond substantially in arrangement with the ribs on the inside, thus serving to further reinforce the jar and to better insulate the jar from its support, especially when the exterior of the jar becomes moist with electrolyte or otherwise, the lower supporting ribs 20 and the insulation hollows 21 between them readily answering this purpose.

Buffer means are provided on the outside of the jar for absorbing mechanical shock, for deflecting oblique blows and impacts, and facilitating sliding the jar safely past obstructing bodies. Horizontally outstanding lugs 22 are formed integrally on the exterior of the jar in suitable number and arrangement for supporting the buffer means 23 composed of more or less elastic or resilient material, as wood, rubber, composition, or the like, preferably formed as a continuous perimetric ring or belt adapted to surround and girdle the jar at a point substantially midway of its height, and to rest upon said knobs 22 for support.

In the construction shown in Figs. 4 and 5 there is illustrated a buffer member 24 of washer-like formation, adapted to lie flat against the face of the jar and to fit closely about a lug 25 suitably formed on the face of the jar to receive and support the buffer thereon. The buffer 24 is formed with inclined or sloping sides 24.1, preferably somewhat convex, to facilitate deflecting blows and impacts, and is thick enough to project beyond the outer end of the supporting lug to protect the same. The lug 25 is formed free from sharp edges or corners to facilitate mounting the buffer member and to prevent cutting or tearing the latter. These lugs 25 and buffer or buffers 24 may be distributed in suitable arrangement on the exterior of the jar to afford ample protection thereto.

When a cell is to be removed from its place in a railway car, or other place where used, it may simply be disconnected from the circuit and removed by grasping the handle on the end of the jar and withdrawing the same. In sliding about among other jars, or other solid objects, the jar is protected from becoming cracked or broken by means of the buffer or buffers thereon.

The plates may be rendered accessible for inspection or alteration by first removing the sealing material, and then lifting off the cover. When the cell is to be sealed the cover is put in place on the jar ledge or seat, and melted paraffin or the like is poured into the space between the cover and the grooved portion of the jar rim.

It is to be understood that no effort has been made to separately illustrate all forms which the invention may assume, and that numerous details of the constructions shown may be altered or omitted without departing from the spirit of this invention as defined by the following claims.

I claim:

1. As an article of ceramic manufacture a rectangular battery jar formed integrally with a plurality of horizontally outstanding lugs spaced apart, in combination with buffer means resting upon the upper sides of said lugs and outwardly overreaching the latter to absorb shock and thereby protect the jar.

2. As an article of ceramic manufacture, a rectangular battery jar having a transversely disposed handle formed integrally across one end, said handle comprising an outstanding body portion adapted to reinforce the jar and support the same when raised by the said handle, a flange depending from the outer part of said body portion and inclined somewhat inwardly to facilitate grasping the handle for drawing the jar horizontally, and vertical web members including an intermediate web connecting said flange with the adjacent end wall to strengthen the handle substantially as described.

3. As an article of manufacture, a battery jar composed of fragile material and having on its side an outstanding handle formed with a depending flange to facilitate handling the jar, in combination with outstanding support means on the side of said jar beneath said handle, and a buffer carried by said support means in spaced relation from said handle to permit reaching the hand between said buffer and handle for gripping the latter and to protect said handle and jar.

Signed at Chicago this 24th day of March, 1913.

RUFUS N. CHAMBERLAIN.

Witnesses:
 EUGENE A. RUMMLER,
 M. IRENE HUTCHINGS.

Copies of this patent may be obtained for five cents each, by addressing the "Commissioner of Patents, Washington, D. C."